Patented May 4, 1943

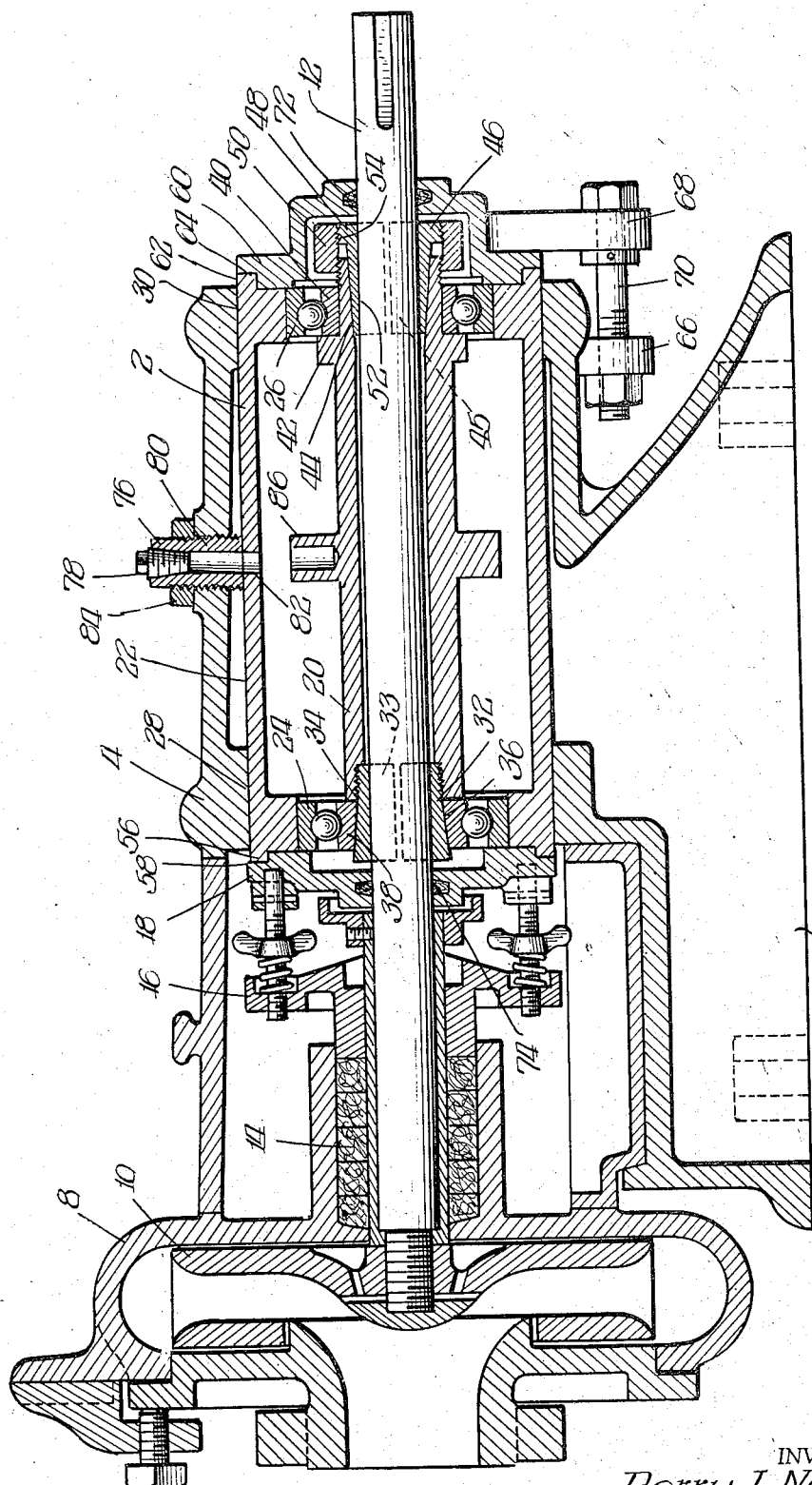

2,318,253

UNITED STATES PATENT OFFICE 2,318,253

BEARING STRUCTURE

Perry I. Nagle, Chicago Heights, Ill., assignor to The American Brake Shoe and Foundry Company, New York, N. Y., a corporation of Delaware Application March 24, 1941, Serial No. 384,806

14 Claims. (Cl. 308—187)

The present invention relates to fluid impelling devices, and more particularly to bearing structures therefor.

Among the objects of the present invention is to provide a novel bearing assembly particularly adapted for rotatably supporting a power-driven shaft or other similar element or device, and particularly an impeller shaft of a fluid impelling device or the like.

The present invention contemplates the provision of a novel bearing structure of unitary assembly adapted to be inserted in place and withdrawn when necessary with ease and facility to properly support a shaft or driving element for a fluid impeller or the like.

More particularly, the invention embraces within the scope thereof a novel bearing assembly involving the use of anti-friction bearings providing a bearing support for a cantilevered drive shaft, such as found in fluid impelling devices and the like, for supporting adjacent its end an impeller or similar structure.

As a further object of the present invention, the said novel bearing assembly incorporates within its structure novel means for adjustably positioning the same with respect to its support and the rotatable element for which the same provides a bearing support such that said element is properly aligned with respect of its associated elements to reduce wear and to increase its operating efficiency.

As a still further object of the present invention, the said bearing structure is embodied in a unitary assembly involving the used of spaced anti-friction bearings and associated elements which are readily adjusted to adjustably position the unitary assembly with respect to the shaft or other element for which the same is provided to compensate for any adjustments needed in said shaft or the like and to provide for proper alignment thereof.

As a further object within the purview of the present invention, the novel bearing structure involves the use of inner and outer sleeves with spaced anti-friction bearings, the said structure being adjustably positioned with the shaft or other element embraced thereby by means associated with the inner sleeve structure which is adapted to adjustably fix the entire assembly to the said shaft or other element, thus providing a suitable bearing to properly align the said shaft for operating conditions without the necessity for extreme axial accuracy in the manufacture of the shaft and its assembly.

Still another object of the present invention is to provide a novel bearing cartridge of unitary assembly adapted to embrace a driving shaft or the like and embodying means for axial adjustment with respect to the said shaft to eliminate need for axial accuracy in the structure of the shaft and its associated elements and to permit relative axial adjustment between the shaft and bearing structure which may be needed to provide for proper operation of the element or mechanism attached to and operatively associated with the said shaft or the like.

The present invention further comprehends a novel bearing cartridge of unitary assembly and embodying novel means for adjusting the same axially with respect to the shaft or the like embraced thereby and the housing or bearing support therefor, thus facilitating the ready adjustment, assembly and disassembly of the same with ease and convenience, yet providing for an efficient bearing medium for the shaft or the like in any of its adjusted positions relative to said shaft.

The invention further contemplates novel structure in a bearing cartridge which includes inner and outer sleeve elements and spaced anti-friction bearings which permit various adjustments of the inner sleeve element into fixed relation to said shaft or the like in order to assure proper concentricity of the bearings, thereby eliminating the need for axial accuracy, yet providing for the proper alignment of the said shaft or the like.

As a further object, the invention embraces within its scope novel means for maintaining the proper position of the elements of the bearing cartridge during its adjustment into proper operative position with respect to the shaft embraced thereby and the housing or support in which the same is mounted.

More particularly, novel means provided for assembly purposes include aligned apertures in the housing and outer sleeve of the bearing cartridge adapted to receive a tool movable into abutting engagement with the inner sleeve and to prevent relative rotation of the elements of the bearing cartridge during the adjustment of the same into operative position with respect to the shaft. As a further improvement in the structure involved, the aperture for the bearing housing may be provided in an adjustable plug movable into engaging relation to the outer sleeve to prevent relative movement thereof with respect to the housing, the said apertured plug being used also for the introduction of lubricant into the bearing cartridge and normally closed to prevent loss of said lubricant during operation of the bearing structure.

Other objects, features, capabilities and advantages are comprehended by the invention, as will later appear and as are inherently possessed thereby.

Referring to the drawing:

The figure is a view in longitudinal cross section of a fluid impelling device embodying within its structure a novel bearing assembly made in accordance with the present invention.

Referring now more in detail to the drawing, the bearing structure embodying the novel features of construction in accordance with the present invention is referred to generally by reference numeral 2 and is shown as being mounted in a housing 4 formed as a part of the supporting structure 6 for a fluid impelling device. The fluid impelling device includes the impeller housing 8 attached to the supporting structure 6 and in which operates a fluid impeller 10 which is rotated by way of the power-driven impeller shaft 12. The impeller shaft 12 extends into the housing 4 and is mounted in cantilevered relation within the bearing cartridge 2 to provide for the proper operation of the impeller 10 with respect to its housing 8 under all conditions. Associated with the shaft 12 on one side of the housing 8 is a gland 14 which is adjustably compressed by the gland follower mechanism, generally referred to as 16, which is disposed between the gland 14 and the bearing cartridge 2, the said gland follower mechanism providing an abutment wall 18 for the said bearing cartridge, thus providing for the positioning of said bearing cartridge at one end with respect to the housing 4 and providing a suitable anchor or seat for the proper manipulation of the adjustable gland follower mechanism.

The bearing cartridge 2 embodies in its structure the inner and outer sleeves 20 and 22, respectively, and the spaced anti-friction bearings 24 and 26 disposed adjacent the ends thereof, the said inner sleeve 20 being fixed by suitable mechanism, as will be hereinafter more fully described, to the shaft 12, and the outer of said sleeves 22 being of a diameter adapted to comfortably fit within the housing 4 over the cylindrical bearing surfaces 28 and 30.

Novel means for adjustably fixing the inner sleeve 20 with respect to the shaft 12 includes a split tubular wedge member 33 comprising elements 32 and 34 adapted to embrace the shaft 12 and being threaded at one end to the sleeve 20 and accordingly movable in accordance with the adjustment which takes place in the sleeve 20. The split tubular wedge member 33 is provided with an exterior cone-forming surface angularly disposed with respect to the longitudinal axis of the shaft 12 adapted to cooperate with a similar cone-forming wedge surface 36 of the inner race-ring 38 for the anti-friction bearing 24. When the elements of the bearing cartridge are in assembled relation, as disclosed in the drawing, the race-ring 38 is disposed in abutting relation to the end of the sleeve 20.

The anti-friction bearing 26 has its inner race-ring 40 mounted upon the sleeve 20 adjacent its other end, the said race-ring being disposed in abutting relation to an annular radial flange 42 provided on the said sleeve 20. The sleeve 20 at the end adjacent the anti-friction bearing 26 is provided with an internal cone-forming wedge surface 44 which is adapted to cooperate with a similar surface formed on the exterior of a split wedge member 45 including the elements 46 and 48 which embrace the shaft 12. Axial adjustment of the inner sleeve structure into adjusted fixed relation to the shaft 12 is effected by way of an adjusting nut 50 at one end of the bearing cartridge 2, and preferably the end which is accessible. The said adjusting nut 50 has opposed threads adjacent the ends thereof engaging the oppositely cut threads 52 and 54 formed at the end of the sleeve 20 and on wedge member 45 whereby the sleeve 20 can be fixed in position with respect to shaft 12 by way of the split wedge members 33 and 45.

It will be clearly appreciated that upon rotation of the adjusting nut 50 relative movement takes place between the sleeve 20 and wedge member 45 to firmly fix the wedge member 45 with respect to the shaft 12 at one end of sleeve 20, and that the same adjustment simultaneously moves the split wedge member 33 with respect to the shaft and the inner race-ring 38 of anti-friction bearing 24 which properly adjusts the anti-friction bearing for efficient operation and at the same time fixes the wedge member 33 and likewise the other end of sleeve 20 with respect to the shaft 12. This adjustment provides for proper concentricity of the bearings 24 and 26 for proper operation of the shaft, and the adjustment eliminates any need for axial accuracy in the construction of shaft 12 and its mounting in respect to the other elements of the fluid impelling device. Furthermore, any wear which takes place on the impeller 10 or its housing 8 which requires adjustment of the impeller to correct or compensate for the said wear, the impeller may be moved axially with respect to the housing upon adjustment of nut 50, after which the nut 50 can be tightened to secure the impeller 10 and the shaft 12 in their new position. This likewise facilitates efficient operation of the fluid impelling device under all conditions and prolongs its useful life. On the other hand, should excessive wear take place on any parts of the bearing cartridge, the same may be readily and easily removed from its operative association with the housing 4 and shaft 12 and replaced by a new bearing cartridge or again inserted in place after repair or replacement of the parts which have become worn.

In order to provide a housing structure which will retain lubricant and secure proper operation of anti-friction bearings 24 and 26, the outer sleeve 22 is adapted to be disposed in abutting relation with the closure or abutment plate 18 of the adjustable gland mechanism through the medium of the interlocking annular flange 56 and recess 58 provided on the sleeve 22 and closure or abutment plate 18, respectively. In order to completely enclose the other end of the bearing cartridge, the closure plate 60 is provided, having interlocking relation with the other end of the outer sleeve 22 through the medium of the annular flanges 62 and 64 provided on the sleeve 22 and closure member 60, respectively, whereby the bearing cartridge is completely sealed to retain lubricant and to prevent the ingress of dirt or other foreign substances which might lead to excessive wear in the bearing structure. This closure member 60 likewise positions the outer sleeve 22 in respect of the housing 4.

In order to position the closure member 60, a plurality of brackets 66 and 68 are provided on the housing 4 and the closure member 60, which are provided with aligned openings to receive bolts, such as 70, which may be tightened as necessary to secure a proper seal for the bearing cartridge and to position the same with respect to the housing 4. This closure 60 is further provided with a lubricant seal 72 cooperating with the shaft 12, which seal corresponds to the seal 74 retained in the opposed closure or abutment plate 18 of the adjustable gland mechanism 16.

The present invention further embraces novel means for introducing lubricant into the bearing cartridge, which also serves in the capacity of preventing rotational movement of the outer sleeve 22 and permits the introduction of a tool engageable with the inner sleeve 20 to prevent relative movement of the sleeves with respect to one another and to the housing 4 whereby an adjustment of the sleeve 20 can be effected through the medium of the adjustable nut 50. Such means embraces a threaded plug 76 engaging an aperture provided in the housing 4 and which in turn is sealed by a threaded plug 78 closing an internal bore or aperture 80 which extends through the upper wall of housing 4 and is adapted to be aligned with an aperture 82 formed in the sleeve 22. This plug 76 is held in position by a lock nut 84 and may be turned into abutting engagement with the sleeve 22 to prevent the latter's rotational movement in the housing 4. The aligned apertures 80 and 82 provide a suitable means for introduction of lubricant for the bearing cartridge and likewise provide means for receiving a tool which is inserted therethrough and into engagement with a recessed protuberance 86 whereby the inner sleeve 20 is held against rotation when the adjusting nut 50 is rotated to fix the inner sleeve structure to the shaft 12 when adjustment of the latter becomes necessary. After adjustment takes place, the tool can be removed and the cap 78 replaced to completely seal the bearing cartridge and to prevent the ingress of foreign substances into the chamber provided for the anti-friction bearings 24 and 26.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. In a fluid impelling device, the combination of a stationary bearing housing, an impeller shaft extending into said housing, a readily replaceable bearing cartridge of unitary assembly mounted within said housing in embracing relation to said shaft, said cartridge comprising concentrically arranged sleeves and spaced anti-friction bearings therebetween, adjustable wedge means for fixing the inner of said sleeves with respect to said shaft, and means including a closure for one end of said cartridge for positioning the same with respect to said housing.

2. In a fluid impelling device, the combination of a stationary bearing housing, an impeller shaft extending into said housing, a readily replaceable bearing cartridge of unitary assembly mounted within said housing in embracing relation to said shaft, said cartridge comprising concentrically arranged sleeves and spaced anti-friction bearings therebetween, split wedge members cooperating with the inner of said sleeves for positioning the same with respect to said shaft, an adjusting nut at one end of said cartridge for adjusting said wedge members to fix said sleeve with respect to said shaft, and means including a closure for said nut for positioning said cartridge with respect to said housing.

3. In a fluid impelling device, the combination of a stationary bearing housing, an impeller housing adjacent thereto, an impeller mounted within said last-named housing, a drive shaft for said impeller extending into said bearing housing, an adjustable gland follower mechanism, and adjustable bearing cartridge of unitary assembly mounted in said bearing housing and disposed in abutting relation to said gland follower mechanism, and adjustable closure means opposed to said gland follower mechanism for adjustably positioning said bearing cartridge with respect to said bearing housing.

4. In a fluid impelling device, the combination of a stationary bearing housing, an impeller housing adjacent thereto, an impeller mounted within said last-named housing, a drive shaft for said impeller extending into said bearing housing, an adjustable gland follower mechanism, a bearing cartridge of unitary assembly mounted in said bearing housing and disposed in abutting relation to said gland follower mechanism, said bearing cartridge comprising inner and outer sleeves and spaced anti-friction bearings, means for adjustably fixing said inner sleeve to said shaft to position said cartridge with respect thereto, means at the end of said bearing cartridge opposed to said gland follower mechanism to effect said last-named adjustment, and means including a closure for said last-named means for adjustably positioning said bearing cartridge with respect to said bearing housing.

5. In a fluid impelling device, the combination of a stationary bearing housing, an impeller shaft extending into said housing, a readily replaceable bearing cartridge of unitary assembly mounted within said housing in embracing relation to said shaft, said cartridge comprising inner and outer sleeves and spaced anti-friction bearings, means for adjustably fixing said inner sleeve to said shaft to position said cartridge with respect thereto, means at one end of said bearing cartridge to effect said last-named adjustment, and means for adjustably positioning said cartridge with respect to said bearing housing.

6. In a fluid impelling device, the combination of a stationary bearing housing, an impeller shaft extending into said housing, a readily replaceable bearing cartridge of unitary assembly mounted within said housing in embracing relation to said shaft, said cartridge comprising inner and outer sleeves and spaced anti-friction bearings, means for adjustably fixing said inner sleeve to said shaft to position said cartridge with respect thereto, means at one end of said bearing cartridge to effect said last-named adjustment, and means including a closure for said last-named means for adjustably positioning said bearing cartridge with respect to said bearing housing.

7. In a bearing structure, the combination of a bearing housing, a shaft extending into said housing, a bearing cartridge mounted in said housing comprising inner and outer sleeves and anti-friction bearings, means for adjustably fixing said inner sleeve to said shaft, means at the end of said bearing cartridge to effect said last-named adjustment, said bearing housing and the outer of said sleeves having apertures